United States Patent [19]
Nordling

[11] Patent Number: 5,943,391
[45] Date of Patent: Aug. 24, 1999

[54] METHOD AND DEVICE FOR A DEBUGGER AND TEST DATA COLLECTOR

[75] Inventor: Karl Ingmar Nordling, Raleigh, N.C.

[73] Assignee: Cirrus Logic, Inc., Fremont, Calif.

[21] Appl. No.: 08/872,788

[22] Filed: Jun. 10, 1997

[51] Int. Cl.⁶ .......................... H04M 1/24; H04M 3/08; H04M 3/22
[52] U.S. Cl. ............................... 379/1; 379/10; 379/12; 379/15; 379/29
[58] Field of Search .............................. 379/1, 2, 10, 12, 379/22, 26, 27, 29, 9, 15, 23, 24, 28; 370/244, 247; 395/684, 183.01, 183.04, 183.06, 183.22, 184.01, 183.15, 185.01

[56] References Cited

U.S. PATENT DOCUMENTS

| | | | |
|---|---|---|---|
| 4,377,852 | 3/1983 | Thompson | 364/900 |
| 4,661,921 | 4/1987 | Barnes | 364/708 |
| 4,796,258 | 1/1989 | Boyce et al. | 371/16 |
| 4,803,683 | 2/1989 | Mori et al. | 371/19 |
| 4,890,316 | 12/1989 | Walsh et al. | 375/8 |
| 4,954,942 | 9/1990 | Masuda et al. | 364/200 |
| 4,987,492 | 1/1991 | Stults et al. | 358/181 |
| 5,047,926 | 9/1991 | Kuo et al. | 364/200 |
| 5,268,928 | 12/1993 | Herh et al. | 375/8 |
| 5,321,828 | 6/1994 | Phillips et al. | 395/500 |
| 5,384,822 | 1/1995 | Brown et al. | 379/10 |
| 5,406,269 | 4/1995 | Baran | 340/825.17 |
| 5,412,799 | 5/1995 | Papadopoulos | 395/500 |
| 5,438,614 | 8/1995 | Rozman et al. | 379/93 |
| 5,485,370 | 1/1996 | Moss et al. | 364/408 |
| 5,528,661 | 6/1996 | Siu et al. | 379/1 |
| 5,530,961 | 6/1996 | Janay et al. | 395/153 |
| 5,535,198 | 7/1996 | Baker et al. | 370/60 |
| 5,539,736 | 7/1996 | Johnson et al. | 370/60 |
| 5,633,909 | 5/1997 | Fitch | 379/15 |
| 5,761,272 | 6/1998 | Williams et al. | 379/10 |
| 5,764,694 | 6/1998 | Raha et al. | 375/224 |
| 5,835,566 | 11/1998 | Cogwill | 379/10 |

*Primary Examiner*—Curtis A. Kuntz
*Assistant Examiner*—Rexford N. Barnie
*Attorney, Agent, or Firm*—Robert P. Sabath; Frank D. Nguyen

[57] ABSTRACT

A computer system comprises a plurality of user computers interconnected through a public-switched telephone network and trunk lines, and also includes a plurality of Remote Data Processing Nodes (RDPNs) similarly connected to each other and to the user computers. A BBS station which is also coupled to the network receives test data from the user computers. Each user computer includes a test unit that includes a digital signal processor and an active control unit. The test unit has a dialing directory for connecting to various BBSs to test out the communication through a modem and the telephone network. Using the dialing directory, the test unit activates the modem to make a predetermined call through the telephone network to several of the RDPNs. The test unit collects survey, snapshot and real-time data packets in a predetermined data file which are communicated to the BBS station for debugging the system and determining the performance of the system.

8 Claims, 9 Drawing Sheets

METHOD AND DEVICE FOR A DEBUGGER AND TEST DATA COLLECTOR

TECHNICAL FIELD

The invention relates to testing communication links, and more particularly testing modem in selected communication links.

BACKGROUND OF THE INVENTION

As both hardware and software components of computers and communication systems become more complex, the ability to simulate the operation of such components in a real world operational environment becomes more difficult. Accordingly, testing such components in an actual operational environment becomes desirable. To accomplish this, hardware and software developers perform alpha and beta tests of their products by providing their products to users for evaluation and testing. However, as systems become more complex, the need for increasing numbers of test products increases. The evaluation of the test products in an operational environment involves accumulating large amounts of data. Such data includes problems that the user encounters during operation. However, such components typically lack sufficient detail to determine the actual failure unless a large amount of users experience the same failure. It would be beneficial to conduct performance, compatibility, and reliability testing of products in an operational environment by collecting sufficient data during the testing. It is also beneficial to provide such testing so that the test environment is as close as possible to the environment experienced by typical users.

SUMMARY OF THE INVENTION

The present invention provides a test unit that tests a communication link between a user computer and several remote computers, such as for instance, bulletin board systems (BBSs). The communication link may include a public switch telephone network and associated trunk lines. A test unit is installed in a selected computer system including a modem connected to the telephone network. The modem is activated to make predetermined calls through the telephone network to the various remote computers, and data packets are collected in a predetermined data file with the test unit. The data packets may be survey data packets, snapshot data packets, or real time data packets. The test unit, according to the present invention, includes a test application program configured to activate a selected modem to make the predetermined call to the telephone network. A data pump, according to the present invention, is configured to collect data packets, such as survey, snapshot, and real-time data packets, in a predetermined data file.

The present invention advantageously provides in situ testing of the data pump, according to the present invention, in various combinations of trunks, lines, and modems during which comprehensive test data is consistently collected independent of operator skills and effort, to allow greater testing of the data pump.

DETAILED DESCRIPTION OF THE INVENTION

Figure 1:
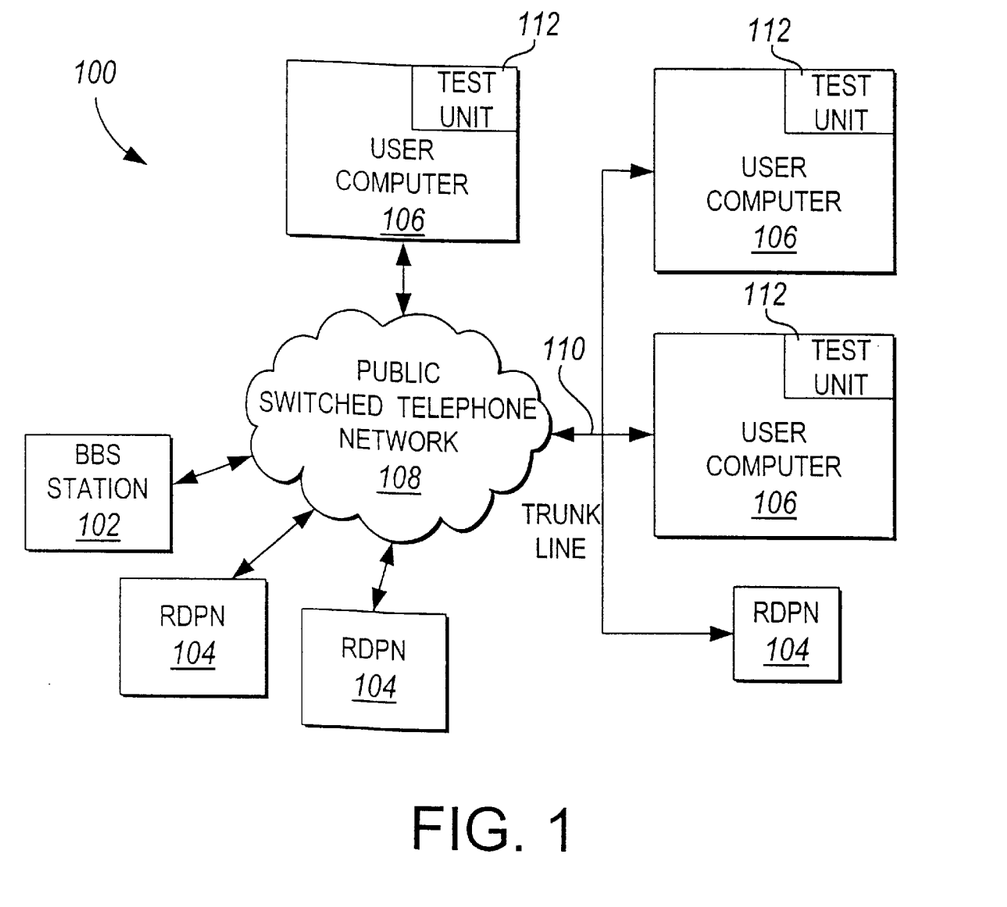
FIG. 1 is a block diagram illustrating a computer system in which the present invention operates.

Referring to FIG. 1, there is shown a block diagram illustrating a computer system 100, which comprises a central data processing node 102, a plurality of remote data processing nodes (RDPN) 104, a plurality of user computers 106, a communication network 108, and a trunk line 110. The remote data processing nodes 104 may be, for example, Bulletin Board Systems (BBSs), and the central data processing node 102 may be a BBS station. The data processing node 104 is referred hereinafter as RDPNs 104, and the central data processing node 102 is referred hereinafter as BBS station 102. The communication network 108 may be, for example, a public switched telephone network or may include the Internet. Each user computer 106 communicates with any RDPN 104 by communicating either over the trunk line 110 if the RDPN 104 is coupled to the same trunk line 110, or through the trunk line 110 and the public-switched telephone network 108 to a RDPN 104 coupled to the public-switched network 108. Each user computer 106 includes a test unit 112 that automatically makes a series of predefined connections to at least one or a portion of the plurality of RDPNs 104. During each such predefined connection, each test unit 112, collects various data types from each connection and stores the data type into a corresponding or selected file type. In one embodiment, the user uploads the files to the BBS station 102 using a user selected modem and communications package. In another embodiment, the test unit 112 automatically controls the uploading of files to the BBS station 102.

Figure 2:
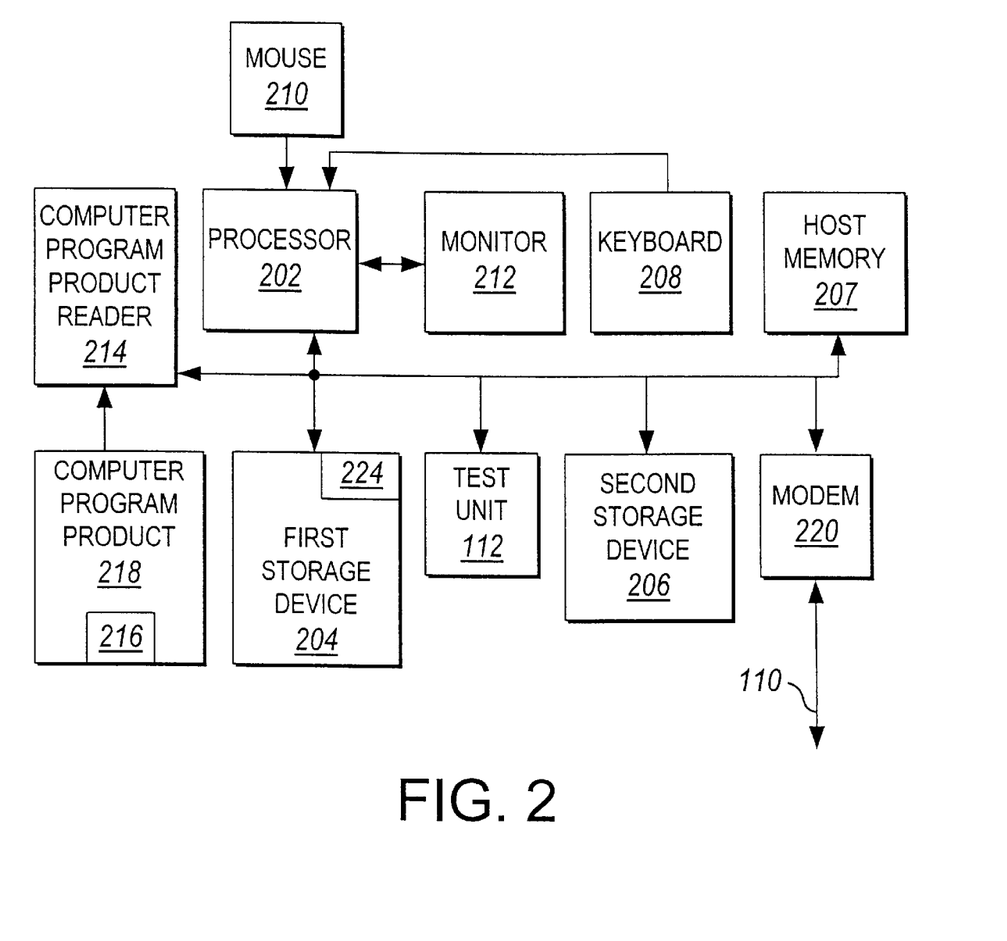
FIG. 2 is a block diagram illustrating a user computer operating in the computer system of FIG. 1.

Referring to FIG. 2, there is shown a block diagram of the user computer 106. The user computer 106 includes a processor 202 coupled to a first storage device 204 such as a memory, and coupled to a second storage device 206 such as a disk storage system. A user may interact with the user computer 106 via a keyboard 208, a mouse 210, and a monitor 212. User computer 106 includes a host memory 207 which is coupled to processor 202.

A computer program product reader 214 may be coupled to the processor 202 to allow computer-readable program code devices 216, such as encoded bits of a computer program product 218, to be input to the processor 202 and stored in the first or second storage devices 204, 206 for use in controlling the operation of the user computer 106 when the computer program product 218 is inserted into a slot (not shown) of the computer program product reader 214. The computer program product reader 214 may be, for example, a memory hard drive, floppy disk drive or CD ROM drive. The computer program product 218 may be, for example, a memory, hard disk, floppy disk, CD ROM or other storage device. An operating system is loaded into the memory 204 or the disk storage 206 or a combination of the memory 204 and the disk storage 206 and instructs processor 202 to load and execute compilers or other applications. Many conventional compilers or other applications are distributed on computer program products 218 such as diskettes, storage devices such as ROMs, or storage devices such as disk storage systems. Each contains computer-readable code devices which cause the user computer 106 to operate in a particular manner when a copy of the code devices is loaded into the user computer 106.

The processor 202 also is coupled to the test unit 112. The processor 202 and the test unit 112 each are coupled to a modem 220 for communication via the trunk line 110 and the public switched telephone network 108 to RDPNs 104. In one embodiment, the test unit 112 evaluates the communication through the modem 220. In one embodiment, the test unit 112 includes the modem 220.

The first storage device 204 includes a mailbox 224 for storing data communicated between the processor 202 and the test unit 112. The mailbox 224 is a dedicated portion of the first storage device 204 that both the processor 202 and the test unit 112 write to and read from during communication between the processor 202 and the test unit 112. In one embodiment, the test unit 112 includes a mailbox.

Figure 3:
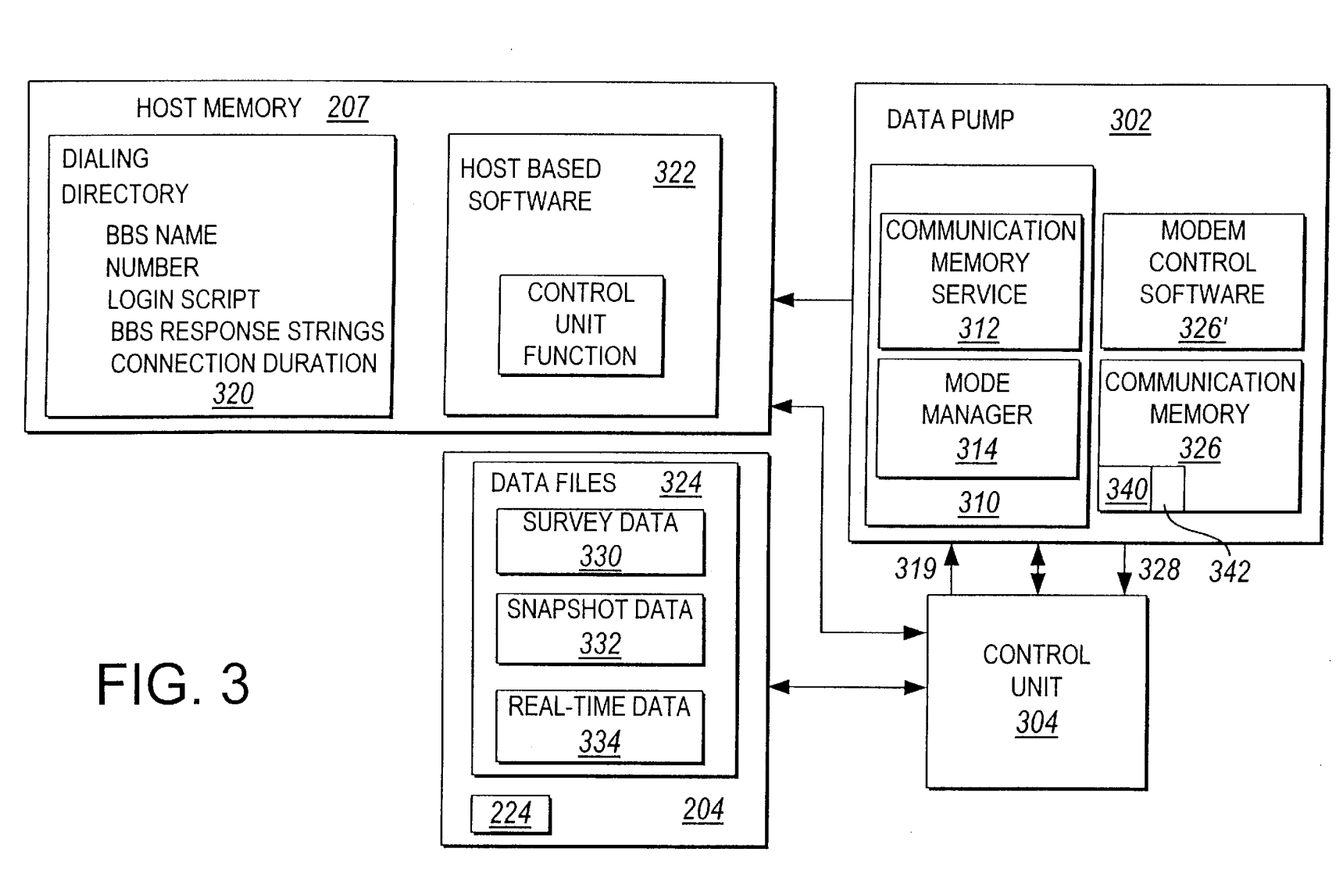
FIG. 3 is a block diagram illustrating a test unit and a first storage device of the computer user computer of FIG. 2 in accordance with the present invention.

Referring to FIG. 3, there is shown a block diagram illustrating the test unit 112 and the first storage device 204. The test unit 112 includes a data pump 302, a control unit 304, and a memory 306 according to one embodiment of the present invention.

The data pump 302 is a digital signal processor that processes data communicated between the test unit 112 and the RDPNs 104 via the modem 220, the public-switched telephone network 108, and the trunk line 110, as shown in FIG. 1. The data pump 302 includes a memory 310 for storing software code, such as instructions for a communication memory service 312 and a mode manager 314. The communication memory service 312 controls the reading and writing to a communication memory 326 (described below). The mode manager 314 controls the operation of the data pump 302. During testing of the connection between the test unit 112 and the called RDPN 104, the data pump 302 generates data about the connection and provides the data as data packets 328 to the control unit 304 for writing to the mailbox 224. The data packets 328 include program and data variables of the data pump 302. The contents of the data packets 328 are dumped and formatted into corresponding file types as described below.

The control unit 304 is coupled to the processor 202 (FIG. 2) and controls the operation of the data pump 302 and communication between the test unit 112, the host memory 207 in the user computer 106, and the communication network 108. The user computer contains a host memory 207 which holds the dialing directory 320 and the host based software 322. The dialing directory 320 includes relevant called station information for calls to be made to at least one RDPN 104. The dialing directory 320 controls the connection between the test unit 112 and the trunk line 110 though the active control unit 304. In one embodiment, the dialing directory 320 includes a BBS name, a telephone number, a login script, BBS response strings, and a connection duration indicator. The host based software 322 controls the operation of the test unit 112. In one embodiment, the user downloads the host based software 322 from the BBS station 102. The control unit 304 provides a modem initialization packet 319 to the data pump 302 to initialize the data pump 302.

The memory 306 includes modem control software 326, and the communication memory 326. In one embodiment, the memory 306 is volatile, and the test unit 112 downloads the modem control software from the host at power up or after a power reset. In one embodiment, the user downloads patch software to the test unit 112. In one embodiment, the user downloads test software to the test unit 112 for testing the test unit 112 or the modem 220. The communication memory 326 includes a modem status register 340 for storing status information about the modem 220. The modem status register 340 includes a no-carrier indicator 342 for indicating that the modem 220 is not receiving a carrier signal.

The first storage device 204 holds data files 324 before storing in second storage device 206, which include a survey data file 330, a snapshot data file 332, and a real-time data file 334. The survey data file 330 includes information characterizing the connections made between the test unit 112 and the RDPNs 104. The snapshot data file 332 includes information about the state of the data pump 302 and the connection between the test unit 112 and the called RDPN 104. The real-time data file 334 includes information for active debugging of a user connection between the test unit 112 and the called RDPN 104.

Figure 4:
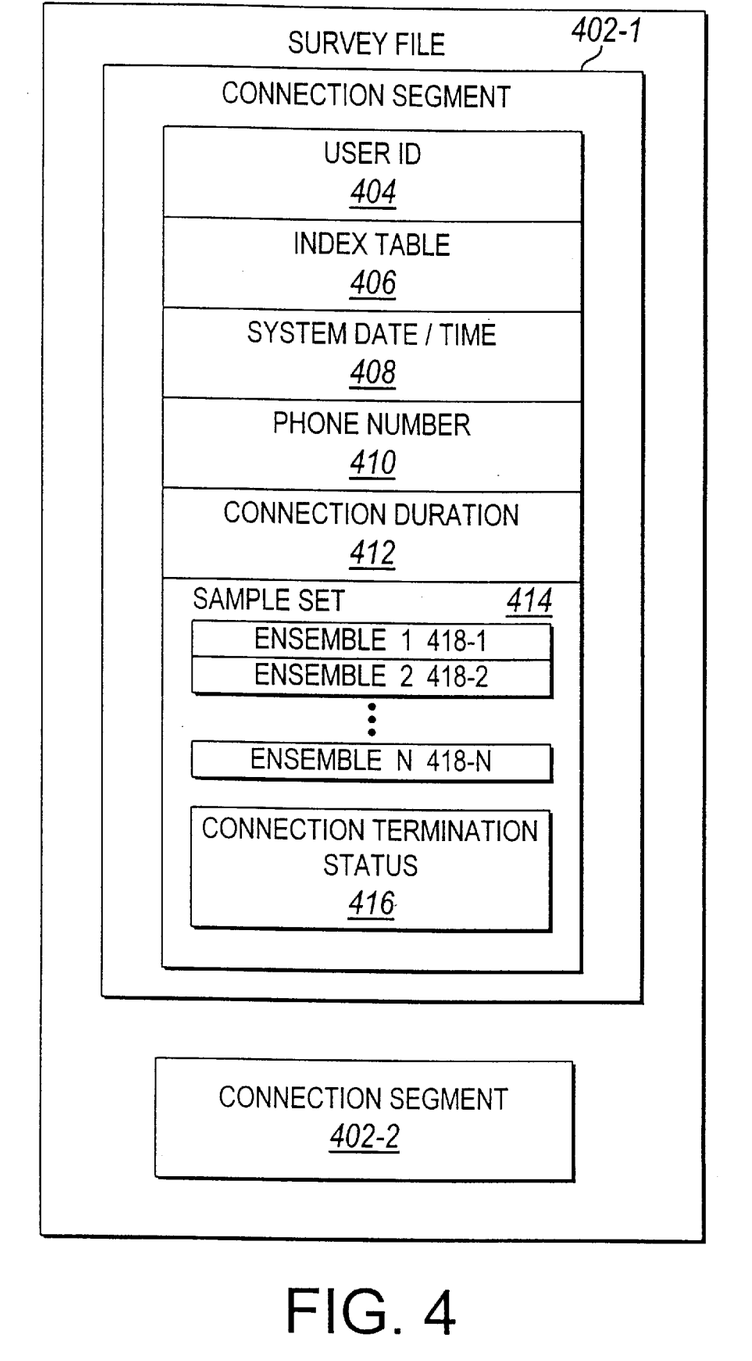
FIG. 4 is a block diagram illustrating a survey file produced according to the present invention.

Referring to FIG. 4, there is shown a block diagram illustrating a survey file 330, which includes a plurality of connection segments 402. For clarity, only two connection segments 402-1 and 402-2 are shown. The survey file 330 contains one connection segment 402 for each connection between the test unit 112 and a called RDPN 104. Each connection segment 402 includes a user identifier (ID) 404, an index table 406, a system date/time indication 408, a phone number 410, a connection duration 412, a sample set 414, and a connection termination status 416. The user identification 404 indicates to the BBS station 102 the user computer 106 and corresponding test unit 112. The index table 406 includes information such as addresses of the variables monitored, code version number, and the like. The data pump 302 retrieves the index table 406 by seeking a fixed location in the memory 306 that contains the starting address of the index table 406. The system date/time indicator 408 is the date and time of the connection. The phone number 410 is the phone number of the RDPN 104 called by the test unit 112. The connection duration 412 indicates the time duration of the connection. The sample set 414 includes a plurality of ensembles 418-1 through 418-N which are sample sets taken at predetermined times in the connection process. The ensembles 418 are sent as mailbox packets 328 with an indication that the data is survey data, by the data pump 302 to the processor 202 during the connection. The connection termination status indicator 416 indicates whether the termination of the connection between the test unit 112 and the RDPN 104 was a normal termination or a failed termination.

Figure 5:
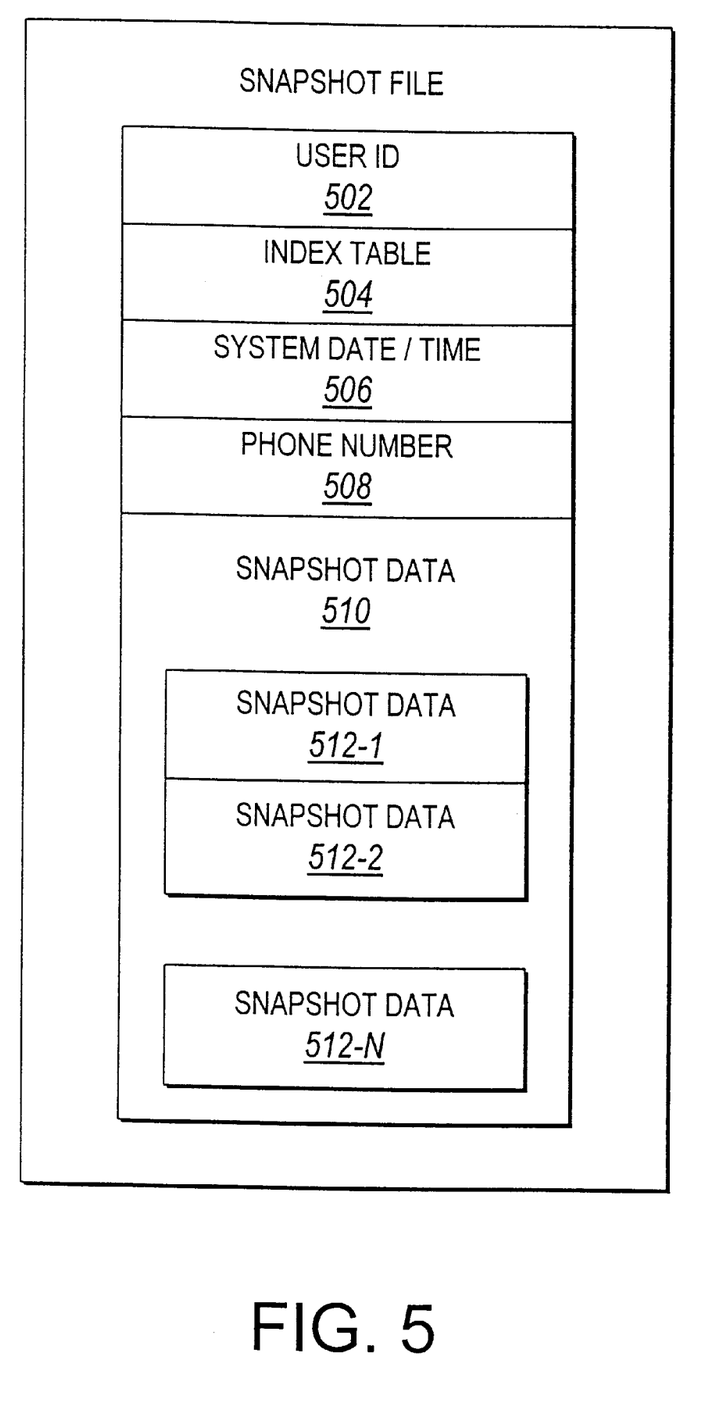
FIG. 5 is a block diagram illustrating a snapshot file produced according to the present invention.

Referring to FIG. 5, there is shown a block diagram illustrating a snapshot file 332, which includes a user identifier (ID) 502, an index table 504, a system date/time indicator 506, a phone number 508, and snapshot data 510. The user identification 502 identifies to the BBS station 102 the user computer 106 and corresponding test unit 112. The index table 504 includes information such as addresses of the variables monitored, code version number, and the like. The data pump 302 retrieves the index table 504 by seeking a fixed location in the memory 306 that contains the starting address of the index table 504. The system date/time indicator 506 is the date and time of the connection. The phone number 508 is the phone number of the RDPN 104 called by the test unit 112. The snapshot data 510 includes a plurality of snapshot sample data 512-1 through 512-N which are sample sets taken at predetermined times of the state of the data pump 302.

Figure 6:
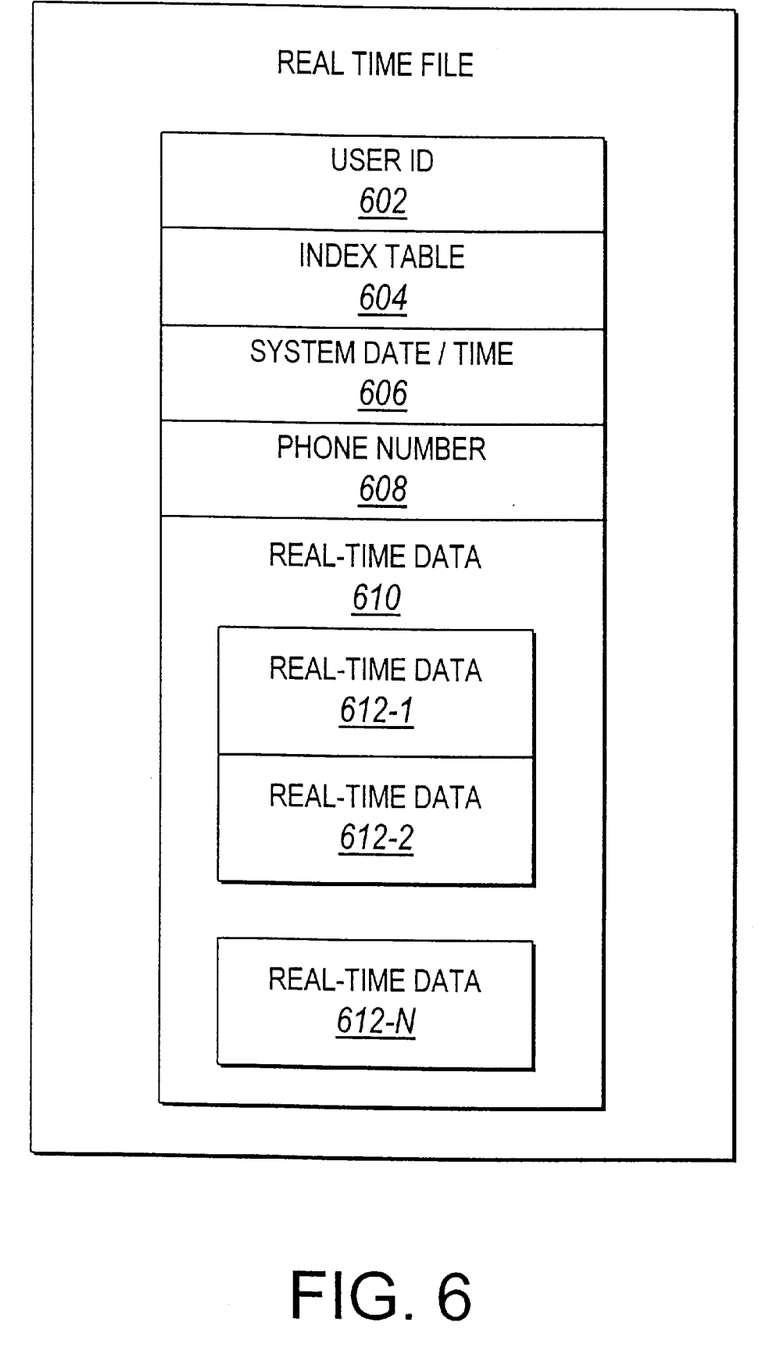
FIG. 6 is a block diagram illustrating a real-time file produced according to the present invention.

Referring to FIG. 6, there is shown a block diagram illustrating a real-time file 334, which includes a user identifier (ID) 602, an index table 604, a system date/time indicator 606, a phone number 608, and real-time data 610. The real-time data 610 includes a plurality of real-time subdata 612-1 through 612-N. The user identification 602 identifies to the BBS station 102 the user computer 106 and corresponding test unit 112. The index table 604 includes information such as addresses of the variables monitored, code version number, and the like. The data pump 302 retrieves the index table 604 by seeking a fixed location in the memory 306 that contains the starting address of the index table 604. The system date/time indicator 606 is the date and time of the connection. The phone number 608 is the phone number of the RDPN 104 called by the test unit 112. The real-time data 610 includes a plurality of real-time data 612-1 through 612-N which are sample sets taken at predetermined times of the state of the data pump 302. In one embodiment, the real-time data includes repetitive samples of a limited number of variables to aid a user in diagnosing failures in software or firmware of the test unit 112 or the modem 220.

Figure 7:
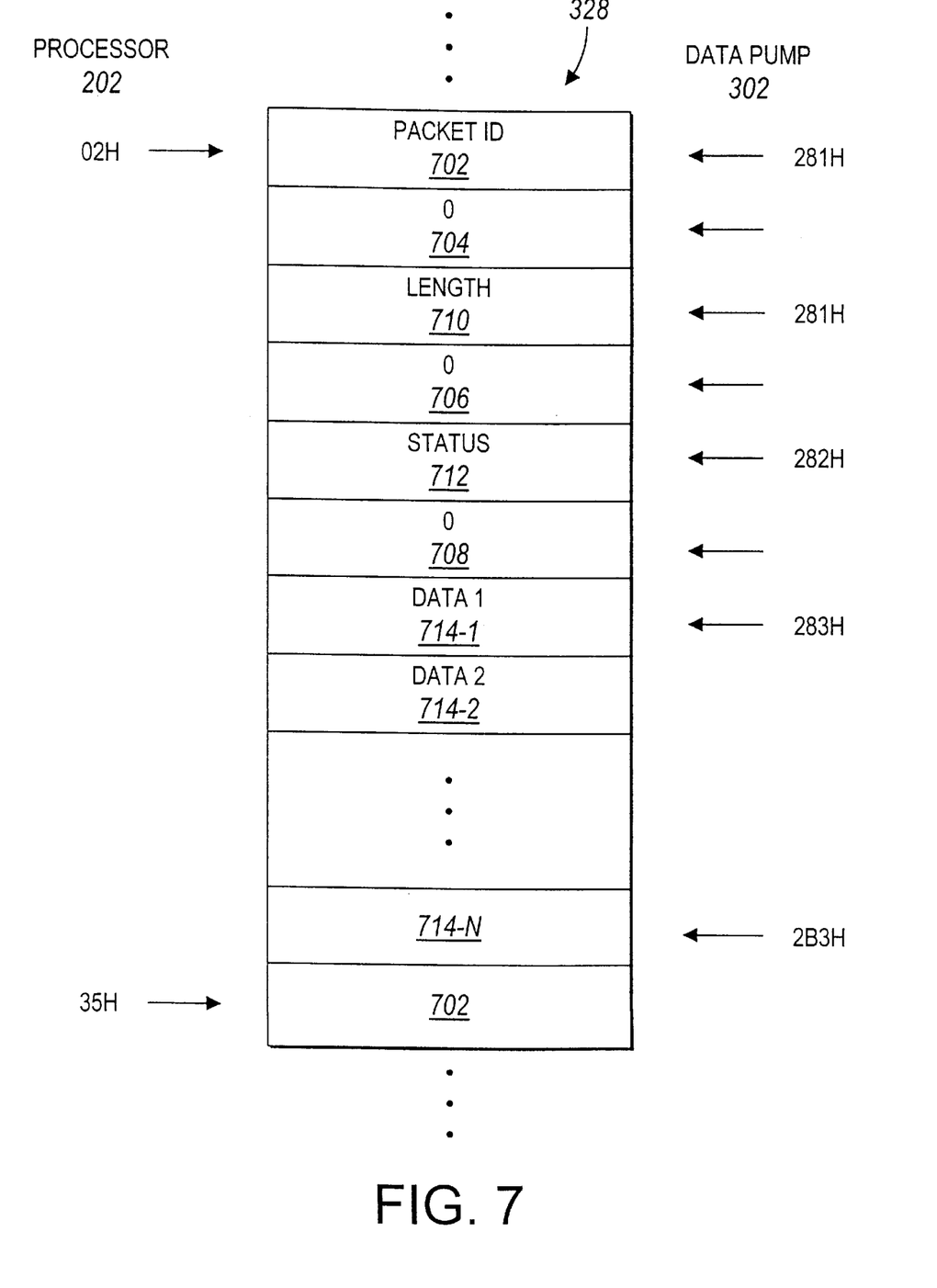
FIG. 7 is a block diagram illustrating a data packet.

Referring to FIG. 7, there is shown a block diagram illustrating a data packet 328. The data packets 328 are identical, according to one embodiment of the present invention, for survey, snapshot, or real-time data, except for the identification. The data packet 328 includes a packet identifier 702, zero bytes 704, 706, 708, a length byte 710, a status byte 712, and data bytes 714. The packet 702 identifies the type of packet, e.g., a survey packet, a snapshot packet or a real-time packet. A length byte 710 indicates the length of the data packet 328. The status byte 712 indicates whether the byte is data, starting and ending points of ensembles and connections, disks or screen, and phase number. In one embodiment, the first three bits of the status byte 712 indicate data and start and end of ensembles and connections. The fourth bit of the status byte 712 indicates whether the data is disk or screen data. The last four bits of the status byte 712 indicate the phase number. In one embodiment, the first three bits of the status byte 712 are encoded as, for example, "000" indicates data, "010" indicates ensemble start, "011" indicates connection start, and "100" indicates connection end.

Figure 8A:
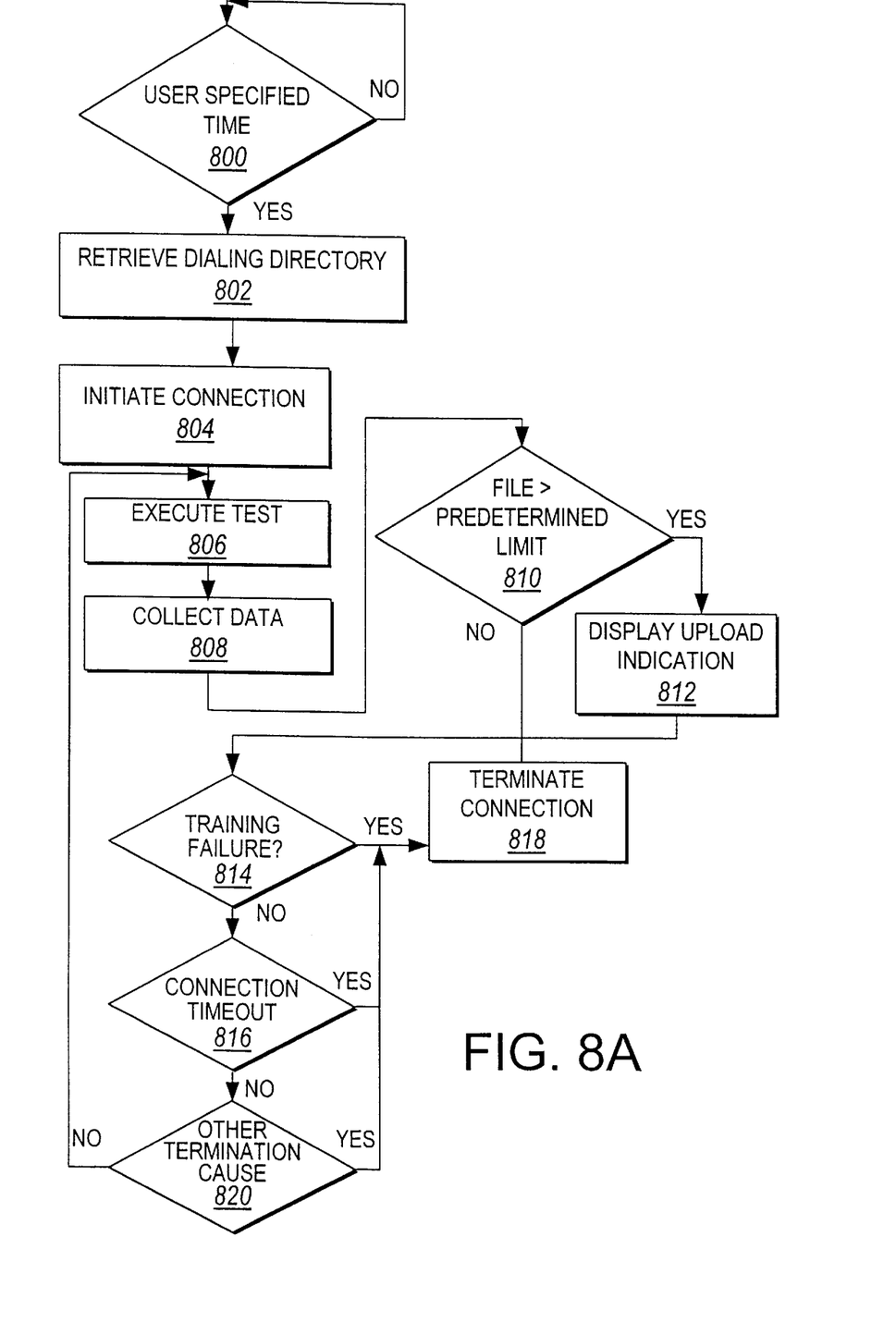
FIGS. 8a–8b are flow charts illustrating the operation of the test unit performing multimode testing of the performance of a modem.
Figure 8B:
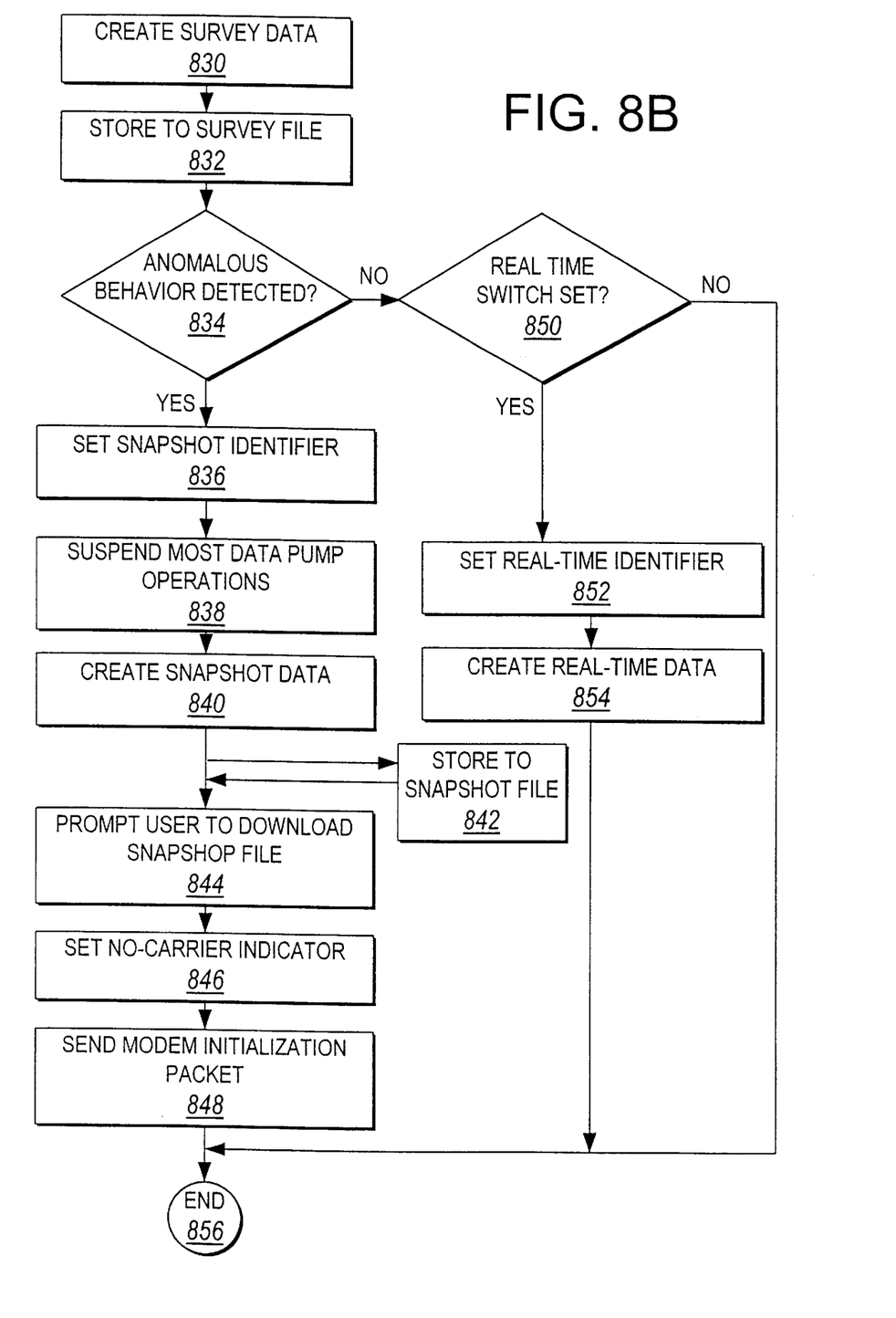

Referring to FIGS. 8a–8b, there are shown flow charts illustrating the operation of the test unit 112. At predetermined times, the test unit 112 activates the modem 220 to connect the test unit 112 to one of the plurality of RDPNs 104. The test unit 112 makes a connection to the RDPN 104 and collects survey data about the connection. The test unit 112 writes survey data to the host memory 207. The processor 202 stores the survey data in the data file 324 until it is downloaded to the BBS station 102. If an anomaly occurs, the test unit 112 generates snapshot data indicative of the state of the test unit 112 which preferably is promptly downloaded to the BBS station 102. The BBS station 102 may control debugging of a user computer 102. The test unit 112 provides real-time data packets to the BBS station 102 to assist a user of the BBS station 102 to diagnose and debug the test unit 112.

Specifically, after 800 a user specified time, the control unit 304 retrieves 802 the dialing directory 320, and initiates 804 a connection via the modem 220 to make a predetermined call through the public-switched telephone network 108 to one of the RDPNs 104. The test unit 112 executes 806 a test of the communication between the test unit 112, the called RDPN 104, and the control unit 304 writes data packets including test information of the communication link. The processor 202 collects 808 the data packets and stores the packets in the first storage device 204. If the data file exceeds 810 a predetermined threshold, a display upload indication is displayed 812 to instruct the user to upload the data file to the BBS station 102. The predetermined threshold may be, for example, the size of the file, the age of the data, or the current date exceeding a predetermined date. The user also is prompted to delete the file after uploading, after which, if the data does not exceed 810 the predetermined threshold, a determination is made whether to continue the connection. Specifically, if a training failure occurs 814 or if a connection time out occurs 816, the connection is terminated 818. Thereafter, test execution 806 continues until otherwise terminated.

Referring specifically to FIG. 8b, there is shown a flow chart of executing 806 a test. The data pump 302 creates 830 survey data by transmitting survey data to the called RDPN 104, and providing mailbox packets 328 to the mailbox 224 with the packet identifier 702 of the data packet 328 set to indicate a survey packet. If a survey packet is indicated, the processor 202 writes 832 the index table 406 to the survey file 330, and records all the packet data in the survey file 330 in response to the survey packets. In one embodiment, the processor 202 updates the survey data file 330 for each connection by appending the packet data plus a current status field, and relevant user identification to the previous contents of the survey data file 330. In one embodiment, the survey file 330 is identified as id_mmyyv.xxx, where "id" is an identifier of the user, "mm" is the month of the year, "yy" is the date of the month, "v" indicates the survey packet type identification, and "xxx" is a file index that preferably is incremented by each connection. In one embodiment, the current status field includes a connection count, such as a running total of connection attempts, and the current date and time.

If anomalous behavior is detected 834 in the connection, the test unit 112 provides data indicative of the state of the test unit 112. In particular, the data pump 302 sets 836 the packet identifier 702 to indicate a snapshot packet. If a snapshot packet is identified, programs executed by the data pump 302 are suspended 838 except for the communication memory service 313 and the mode manager 314. The data pump 302 creates 840 snapshot data by determining the state of the data pump 302 and of the connection. The data pump 302 provides mailbox packets 328 to the mailbox 224 with the packet identifier 702 set to indicate a snapshot packet. The processor 202 reads the mailbox 224, and writes the index table 504 to the snapshot file 332, and stores 842 all the packet data in the snapshot file 332 in response to the snapshot packets. In one embodiment, the snapshot file 332 is identified as id_mmyys.xxx, where "id" is an identifier of the user, "mm" is the month of the year, "yy" is the date of the month, "s" indicates the snapshot packet type identification, and "xxx" is a file index that preferably is incremented by each connection. The user is prompted 844 to download the snapshot data file 332 to the BBS station 102 and to delete the data in the snapshot data file 332. After all snapshot data has been transferred to the mailbox 224, the data pump 302 sets 846 a no-carrier indicator 342 in the modem status register 340 in the communication memory 326, after which the control unit 304 provides 848 the modem initialization packet 319 to the data pump 302 to reinitialize the data pump 302.

On the other hand, if anomalous behavior is not detected 834, the control unit 304 determines 850 if a real-time switch has been set by the base station 102 for debugging. If not, the test ends 856. Otherwise, the data pump 302 sets 852 the packet identifier 702 to indicate a real-time data packet, and creates 854 real-time data, which the data pump 302 provides in mailbox packets 328 to the mailbox 224. The processor 202 writes the index table 604 and records all uploaded data to the real-time file 334 in response to the real-time packets. In one embodiment, the real-time file 334 is identified as id_mmyyr.xxx, where "id" is an identifier of the user, "mm" is the month of the year, "yy" is the date of the month, "r" indicates the real-time packet type identification, and "xxx" is a file index that preferably is incremented by each connection. The user is prompted to upload the file to the BBS station 102 and provided a reminder that, after a successful upload of the file, the user may delete the data from the real-time data file 334 without loss of data.

What is claimed is:

1. A method of testing and debugging connections to remote data processing nodes, comprising:

causing a data pump to generate survey data including sample sets taken at predetermined times indicative of a connection to a remote data processing node;

detecting anomalous behavior in the connection; and if anomalous behavior is detected, generating snapshot data of the state of the data pump, storing said snapshot data in a snapshot data file, and downloading said snapshot data file to a central processing node, and if anomalous behavior is not detected, storing said survey data in a survey data file, and downloading said survey data file to said central processing node each time after a predetermined threshold has been exceeded.

2. The method according to claim 1, further comprising: causing said data pump to generate real-time data and store said real-time data in a real-time data file so as to be available to said central processing node for downloading, provided a real-time switch has been set by said central processing node for debugging of said data pump and said connection.

3. The method according to claim 2, further comprising: downloading control software from said central processing node to a test unit including said data pump to control said data pump.

4. The method according to claim 2, further comprising: displaying a display upload indication to instruct a user to upload said survey data file to said central processing node after said survey data file exceeds said predetermined threshold.

5. The method according to claim 4, wherein said downloading of said snapshot data file comprises prompting said user to download said snapshot data file to said central processing node.

6. The method according to claim 4, further comprising: prompting said user to download said real-time data file to said central processing node after real-time data is stored in said real-time data file.

7. An apparatus coupled to a central processing node for testing and debugging connections to remote data processing nodes, comprising:

a data pump coupled to a remote data processing node, said data pump programmed to generate survey data including sample sets taken at predetermined times indicative of a connection to said remote data processing node;

means for detecting anomalous behavior in the connection; and means, if anomalous behavior is detected, for generating snapshot data of the state of the data pump, storing said snapshot data in a snapshot data file, and downloading said snapshot data file to a central processing node, and, if anomalous behavior is not detected, for storing said survey data in a survey data file, and downloading said survey data file to said central processing node each time after a predetermined threshold has been exceeded.

8. The apparatus according to claim 7, wherein said data pump is further programmed to generate real-time data and store said real-time data in a real-time data file so as to be available to said central processing node for downloading, provided a real-time switch has been set by said central processing node for debugging of said data pump and said connection.

* * * * *